US006277899B1

(12) United States Patent
Bastioli et al.

(10) Patent No.: US 6,277,899 B1
(45) Date of Patent: *Aug. 21, 2001

(54) BIODEGRADABLE POLYMERIC COMPOSITION

(75) Inventors: Catia Bastioli, Novara; Vittorio Bellotti, Fontaneto d'Agogna; Roberto Lombi, Novara; Matteo Nicolini, Cressa, all of (IT)

(73) Assignee: Novamont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/428,070

(22) Filed: Oct. 27, 1999

Related U.S. Application Data

(62) Continuation of application No. 09/255,633, filed on Feb. 22, 1999, now abandoned, which is a continuation of application No. 08/362,589, filed as application No. PCT/EP93/01530 on Jun. 14, 1993, now Pat. No. 5,874,486.

(30) Foreign Application Priority Data

Aug. 3, 1992 (IT) ............................... T092A0672

(51) Int. Cl.[7] ............................... C08L 3/00; C08L 1/00; C08L 5/00; C08K 5/053; C08K 3/34
(52) U.S. Cl. ........................... 523/128; 524/10; 524/12; 524/13; 524/14; 524/29; 524/35; 524/47; 524/414; 524/430; 524/449; 524/451
(58) Field of Search ................... 523/124, 128; 524/10, 12, 13, 14, 15, 29, 35, 47, 49, 50, 51, 414, 430, 437, 449, 451, 425

(56) References Cited

U.S. PATENT DOCUMENTS

| 5,095,054 | 3/1992 | Lay et al. ............................... 524/47 |
| 5,480,923 | * 1/1996 | Schmid et al. ......................... 524/47 |
| 5,874,486 | * 2/1999 | Bastioli et al. ....................... 523/128 |

FOREIGN PATENT DOCUMENTS

| B-19444/92 | 1/1993 | (AU) . |
| 2 305150 | 8/1974 | (DE) . |
| 0 522 358 | 1/1993 | (EP) . |
| 136047 | * 5/1992 | (JP) . |
| WO 92/04408 | 3/1992 | (WO) . |

OTHER PUBLICATIONS

Patent Abstracts of Japan, vol. 16, No. 406 (C–978) (5449) & JP 41 36 047 (Kuraray Co Ltd), May 1992.

Derwent Abstract AN 92–295587 & JP,A,4 202 429, Jul. 1992.

Derwent Abstract of DE 2305150, Aug. 1974.

* cited by examiner

*Primary Examiner*—Peter Szekely
(74) *Attorney, Agent, or Firm*—Bryan Cave LLP

(57) ABSTRACT

A polymeric composition comprising a filler melt-dispersed in a matrix comprising, a destructurized starch component; a synthetic thermoplastic polymeric component selected from the group consisting of polyvinylalcohol, polyvinyl acetate, thermoplastic polyesters and graft copolymers of polysaccharides; and a fluidizing agent selected from the group consisting of $C_{12}$–$C_{22}$ fatty acids, $C_{12}$–$C_{22}$ fatty alcohols, esters and amides of said fatty acids, polyolefin waxes, polyglycol ethers of alditols, polyglycerols esterified with $C_{12}$–$C_{22}$ fatty acids, and mixtures thereof, wherein said filler is a mixture of an inorganic filler and a filler of organic nature, wherein the organic filler is present in an amount from 5% to 70% by weight.

10 Claims, No Drawings

BIODEGRADABLE POLYMERIC COMPOSITION

This is a continuation of U.S. patent application Ser. No. 09/255,633, filed Feb. 22, 1999, abandoned which is a continuation of U.S. patent application Ser. No. 08/362,589, filed Mar. 27, 1997 now U.S. Pat. No. 5,874,486 which claims the benefit of PCT Application Ser. No. PCT/EP93/01530 filed on Jun. 14, 1993.

The present invention relates to a biodegradable polymeric composition of the type including starch and synthetic thermoplastics polymers, suitable for the production of biodegradable articles having satisfactory physical and mechanical properties, by means of conventional techniques applied to thermoplastics materials of synthetic origin.

Thermoplastics compositions of the type specified above are known and available commercially and are described, for example, in patent applications EP-A-0 032 802, EP-A-0 327 505, WO 90/10671, EP-A-0 400 532, EP-A-0 404 723, EP-A-0 404 727, EP-A-0 404 728, WO 91/02024, WO 91/02025 and U.S. Pat. No. 5,095,054.

Typically these compositions can be obtained by the mixing of a starch component with a synthetic thermoplastics polymeric component in conditions typical of the "extrusion-cooking" process, that is in presence of a limited quantity of water (typically 5–40% by weight with reference to the starch-water system) or of a plastisizer at a high enough temperature and pressure to destroy the crystalline structure of the starch and to obtain a molten thermoplastics mass.

The object of the present invention is to provide compositions of the type specified above which have improved mechanical properties, particularly a higher rigidity, even in the presence of high humidity, and properties of processability comparable with those of conventional plastics, while retaining or surpassing the rate of biodegradability of the known compositions.

This object is achieved by virtue of a polymeric composition comprising a matrix including a starch component and at least one synthetic thermoplastics polymeric component in which a filler is dispersed, characterized in that the matrix includes a fluidising agent selected from the group consisting of: $C_{12}$–$C_{22}$ fatty acids, $C_{12}$–$C_{22}$ fatty alcohols, esters and amides of the said fatty acids, polyolefin waxes and polyglycol ethers of alditols or polyglycerols esterified with the said fatty acids and their mixtures and the said filler comprises natural fillers of an organic nature dispersed in the matrix in quantities of from 5% to 70% by weight with reference to the total weight of the composition.

The materials constituting the fillers are preferably selected from wood flour, walnut shells, cellulose, cotton, jute, raffia, rice chaff, animal bristles, chitin and granular starch and their mixtures; of these the preferred are the fibrous materials. The dimensions of the fillers may vary within wide limits according to the mechanical properties which it is intended to bestow. Typically the average dimensions are between 0.5 and 500 microns, preferably between 1.5 and 300 microns; the shape ratio L/D is generally between 1 and 100 and preferably between 2 and 50.

The preferred filler concentrations are in the range 20%–50% by weight with reference to the weight of the composition. In combination with the natural organic fillers listed above, the compositions may include inorganic fillers such as talc, mica, titanium dioxide, aluminium oxide in concentrations preferably no higher than 5% by weight. The fillers may be surface treated to improve their affinity with the matrix material, for example, by means of linking agents such as titanates or zirconates or by silanisation.

The preferred matrix materials include the starch component and the synthetic thermoplastics component typically in a ratio of from 1:9 to 9.8:0.2, preferably from 1:4 to 4:1 and more preferably from 1.5:1 to 1:1.5.

The starch used is generally a natural starch extracted from various plants such as maize, potato, tapioca and cereals; it is intended that the term starch should be understood to include starches with a high amylopectin content (waxy starches) and chemically and physically modified starches, such as for example starches whose acid values have been reduced to between 3 and 6, starches in which the type and concentration of cations associated with the phosphate groups have been modified, ethoxylated starches, starch acetates, cationic starches, oxidated starches and cross-linked starches.

As the polymeric component, the polymers described in the patent literature mentioned in the introduction to the present specification may be used.

The synthetic polymeric component is preferably selected from the following polymers and copolymers and their mixtures:

(A) Polyvinyl alcohol, polyvinyl acetate and copolymers of an olefin selected from ethylene, propylene, isobutene and styrene with one or more monomers selected from acrylic acid, methacrylic acid, $C_1$–$C_4$ alchylacrylate, $C_1$–$C_4$ alkylmethacrylate, vinyl alcohol, vinyl acetate and maleic acid, such as ethylene-acrylic acid, ethylene-vinyl alcohol, ethylene-vinyl acetate, ethylene-maleic anhydride copolymers and their mixtures; the particularly preferred compounds are ethylene-vinyl alcohol copolymers with an ethylene content of from 10–44% by weight produced by the hydrolysis of the corresponding poly-ethylene-vinyl acetate with a degree of hydrolysis of between 50 and 100;

(B) Thermoplastics polyesters such as, in particular, homopolymers and copolymers of hydroxyaliphatic acids having from 2 to 24 carbon atoms, preferably 2 to 8 carbon atoms, the corresponding lactones or lactides and polyesters derived from bifunctional carboxylic acids with aliphatic diols.

(C) Graft copolymers of polysaccharides and their derivatives, such as starches, cellulose, modified cellulose, rubbers, alginates, pectins, dextrins and pullulans with monomers such as styrene, methylmethacrylate, methylacrylate, butylacrylate, butadiene, isoprene, acrylonitrile; graft copolymers of polysaccharides are described in the Encyclopedia of Polymer Science and Engineering, John Wiley & Sons, Volume 3, 1986. In particular, in group B the preferred polymers and mixtures of polymers selected are:

B1) poly-epsilon-caprolactone, copolymers of epsilon-caprolactone with isocyanates such as, in particular, 4,4'-diphenylmethane diisocyanate, toluylene diisocyanate, isophorone diisocyanate or hexamethylene diisocyanate;

B2) polymers of lactic acid or polylactides, of glycolic acid or polyglycolides, copolymers of lactic acid and glycolic acid;

B3) polyhydroxybutyrrate, polyhydroxybutyrrate/valerate;

B4) polymers derived from dicarboxylic acids with aliphatic diols such as, in particular, polyethylene and polybutylene adipate or sebacate;

B5) block or graft copolymers formed between homopolymers and copolymers of hydroxyacids, in particular poly-epsilon-caprolactone, and one or more of the following components:

i) cellulose or modified cellulose, for example, carboxymethylcellulose and cellulose acetate;

ii) amylose, amylopectin, natural or modified starches;

iii) polymers resulting from the reaction of a compound selected from aliphatic diols (such as ethylene glycol, propylene glycol, butylene glycol, polyoxyethylene glycol, polyoxypropylene glycol, neopentyl glycol, 1,4-butanediol, cyclohexanediol), prepolymers or polymers of polyesters having terminal diol groups with monomers selected from:

bifunctional aromatic or aliphatic isocyanates, bifunctional aromatic or aliphatic epoxides, dicarboxylic aliphatic acids (such as malonic, succinic, maleic, fumaric, itaconic, glutaric, adipic, pimelic, suberic, azeleic and sebacic acids), dicarboxylic cycloaliphatic acids (such as cyclohexanedicarboxylic acid, 2,2,2-dicyclooctanedicarboxylic acid) or aromatic acids or anhydrides (such as phthalic acid), iv) polyurethanes, polyamides-urethanes from diisocyanates and aminoalcohols, polyamides, polyesters-amides from dicarboxylic acids and aminoalcohols, polyester-urea from aminoacids and diesters of glycols, v) polyhydroxy polymers (such as polyvinyl alcohol, ethylene-vinyl alcohol copolymers, totally or partially hydrolysed), vi) polyvinyl pyrrolidone, polyvinyl pyrrolidone-vinylacetate copolymers and polyethyloxazoline, B6) polyesters obtained from monomers of hydroxyacids upgraded with chain lengtheners such as isocyanates, epoxides, phenylesters and aliphatic carbonates;

B7) polyesters obtained from monomers of hydroxyacids partly cross-linked with polyfunctional acids such as trimellitic acid, pyromellitic acid, polyisocyanates and polyepoxides.

More particularly, the polymers B5–B7 are useful to provide compatibility in combination with the polymers B1–B4, optionally in combination with polymers of the group A.

The matrix materials used within the scope of the invention preferably have a melt flow rate greater than 2 g/10 minutes, more preferably greater than 5 g/10 minutes and still more preferably, greater than 10 g/10 minutes (determined in a capillary tube having a diameter of 2.1 mm and a length of 8 mm at 170° C. with a load of 5 kg) and preferably have a water content of from 2–10% by weight (as extruded and without conditioning).

Preferably the synthetic component of the matrix material includes a mixture of one or more polymers from the group A) with one or more polymers from the groups B) and/or C) listed above in a weight ratio to each other preferably of from 1:6 to 6:1 and more preferably from 1:4 to 4:1.

A further component preferably used in the matrix material of the invention is a plasticizer in a total quantity of between 1 and 50% with reference to the sum of the starch component and the synthetic polymer component and preferably between 5 and 25% by weight. In the term plasticizer it is intended to include aliphatic polyols and their acetate, ethoxylate and propoxylate derivatives, in particular, glycerine, ethylene or propylene glycol, ethylene or propylene diglycol, ethylene or propylene triglycol, polyethylene glycol, polypropylene glycol, 1,2-propanediol, 1,3-propanediol, 1,2-, 1,3-, 1,4-butanediol, 1,5-pentanediol, 1,6-, 1,5-hexanediol, 1,2,6-, 1,3,5-hexanetriol, neopentyl glycol, trimethylol propane, pentaerithritol, sorbitol and their acetate, ethoxylate and propoxylate derivatives, in particular sorbitol ethoxylate, glycerol ethoxylate, pentaerithritol ethoxylate, sorbitol acetate, pentaerithritol acetate and polyvinyl alcohol; a mixture of different plasticizers may be used.

Plasticizers suitable for use are described in International patent application PCT/EP92/00320 which is incorporated in the present specification by means of its citation.

The fluidising agents previously mentioned are particularly useful for the production of compositions with a high filler content.

These agents include fatty acids such as oleic, palmitic, stearic, linoleic, linolenic, recinoleic, erucic acids, the corresponding fatty alcohols or esters or amides of the fatty acids listed above, in particular, mono-,di-, or tri-glycerides of the said fatty acids.

Particularly advantageous as fluidisers for the matrix material are polyglycol ethers of alditols or polyglycerols esterified with fatty acids, where the polyglycol is preferably ethylene glycol or propylene glycol, the alditol is preferably selected from sorbitol, xylitol, mannitol, the polyglycerol preferably has from 3 to 10 repeat units and the fatty acid is preferably a $C_{12}$–$C_{22}$ acid, preferably saturated; preferred compounds include in particular:

sorbitol ethoxylate mono- di- or tri-octadecanoate (CAS n. 68025-57-0) in particular poly(oxy-1,2-ethanediol), alpha-hydro-omega-hydroxy-ether with D-glucitol (3:1), tris-(Z)-octadecanoate; and sorbitol propoxylate mono- di- or tri-octadecanoate where the ethoxylation or propoxylation of the free hydroxyl groups may be complete or partial.

The fluidiser is typically used in concentrations of from 0.1 to 10% by weight with reference to the weight of the matrix component.

The compositions according to the invention are preferably prepared by means of the prior preparation of the matrix material including the fluidising agent or mixture of fluidising agents listed above. The preparation of the matrix material is effected by conventional processes described in the patent literature mentioned in the introduction to the present specification, that is in conditions typical of the "extrusion-cooking" process. This process comprises the mixing of the components, preferably in a heated extruder or in any device which ensures a temperature and shearing stress sufficient to render the starch material and the polymeric component compatible from a rheological point of view; in the presence of water (up to 40% with reference to the starch/water system) and/or a plastisizer at a temperature of from 80 to 210° C. The preferred method for the preparation of the matrix material comprises:

a first stage in which the components are conveyed and/or mixed in an extruder for periods of time of the order of 2 to 50 seconds in which the starch component and the synthetic polymeric component are swelled by means of the plastisizer available and/or any water present at a temperature of between 80 and 180° C.;

a mixing stage in which the mixture is subjected to shearing stresses which correspond to similar values of viscosity of the polymeric and starch components, optionally, a degassing phase in which the mixture is degassed under free conditions or under controlled conditions of pressure or under vacuum to obtain a melt preferably at a temperature of from 130 to 180° C. with a water content preferably less than 6% such as not to create bubbles at atmospheric pressure, for example, at the outlet from the extruder, whenever it is not wished to produce expanded products.

The melt may then be extruded directly in stranded, spaghetti-like form and in a subsequent stage the strands are mixed with the desired filler content, possibly with the addition of further fluidisers and/or plasticizers in a heated extruder to obtain an extrusion in the form of pellets suitable for conversion by conventional working processes for plastics materials.

Alternatively, the components of the matrix material and the fillers may be mixed directly in a single stage. The matrix material may also include small quantities of hydrophobic polymers in its formulation, such as polyethylene, polypropylene, polystyrene, even though, in order to maintain good characteristics of biodegradability, these polymers are preferably used in quantities no greater than 5% by weight of the total weight of the composition.

The matrix material may further include additives such as cross-linking agents such as aldehydes, ketones, and glyoxals, process adjuvants, antioxidants, release agents, opacifiers or stabilisers.

EXAMPLE 1

A two-screw/single-screw APV/V30 extruder was supplied with the following composition expressed in parts by weight:

| | |
|---|---|
| Globe Cerestar (Registered Trade Mark) starch with an intrinsic water content of 12% by weight | 40.5 |
| EVOH (*) | 30.4 |
| EAA (**) | 4.3 |
| Erucamide | 0.25 |
| Plasticizer (***) | 21.5 |
| Fluidizer (****) | 3.1 |

(*) poly-ethylene-vinyl alcohol, 44% molar ethylene content hydrolysys degree: 99.5 of the acetate groups
(**) poly-ethylene-acrylic acid, 20% by weight ethylene
(***) mixture of plasticizers: sorbitol acetate 65.5%, water 14%, glycerine 20.5% by weight, containing 0.5% of free acetic acid
(****) sorbitol ethoxylate trioctadecanoate.

The two-screw section of the extruder was operated with a heat profile of between 60 And 170° C.

Screw rotation:250 rpm: screw diameter 30 mm; L/D=10.

The two-screw section was provided with an intermediate portion with a pressure of 0.9 bar.

The single-screw section was operated with a heat profile of between 150 and 140° C.; screw rotation 80 rpm; screw diameter 38 mm, L/D=16.

The extruded strands with a water content of about 5.2% by weight, were granulated and then fed to a Sandretto injection moulding press from which dumb-bell shaped test pieces (ASTM 638) were obtained which were subjected to tests to determine their mechanical properties:

Modulus of elasticity 197 MPa

Breaking load: 14.4 MPa

Elongation: 656%

MFR: 15 g/10 minutes

EXAMPLE 2

The matrix material of Example 1 was used for the production of compositions including fillers according to the invention with the following formulation, expressed in parts by weight:

| | |
|---|---|
| Matrix material: Example 1 | 53 |
| Filler: wood flour (*) | 40 |
| Polyethylene wax | 7 |

(*) maximum particle size: 200 microns

The composition listed above was supplied to a two-screw/single-screw MPC/V30 extruder operated with the following conditions:

Two-screw extruder: L/D=10: D=10 mm; screw rotation; 250 rpm, with a heat profile between 160 and 170° C.

Single screw: D 38 mm; L/D=16; screw rotation 50 rpm with a heat profile between 170 and 160° C.

The extruded strands were supplied to an injection press provided with a mould for forming dumb-bell shaped test pieces (ASTM 638) and the test pieces were obtained under the following conditions:

Heat profile: 155/160/165/165° C.

Mould temperature: 18° C.

Injection pressure: 1600 bar

Injection speed: 114 $cm^3$/s

The mechanical properties of the test pieces obtained are given in Table 1.

EXAMPLE 3

The procedure of Example 1 was repeated with the use of a filler constituted by wood fibres with a maximum fibre length of about 3.5 mm.

The results of mechanical tests are given in Table 1.

EXAMPLE 4

The procedure of Example 2 was repeated with the variation that a profiled section in the form of a platelet having a thickness of 5.7 mm was extruded directly from the two-screw/single-screw extruder and subjected to the determination of its mechanical properties according to ASTM 638.

The values of the mechanical properties are given in Table 1.

TABLE 1

| Example | 2 | 3 | 4 |
|---|---|---|---|
| Breaking Load (MPa) | 31.6 | 32.6 | 15 |
| Elongation (%) | 1.4 | 1 | 1 |
| Modulus of Elasticity (MPa) | 4797 | 5455 | 2846 |
| Breaking Energy (kj/$m^2$) | 13.43 | 9.5 | 3 |

EXAMPLES 5–6

The procedure of Example 2 was repeated with the use of the following formulations expressed in parts by weight:

| | EX. 6 | EX. 7 |
|---|---|---|
| Matrix material: Ex. 1 | 70 | 60 |
| Filler: Wood Flour (*) | 25 | 40 |
| Polyethylene wax | 5 | — |

The test pieces obtained from the injection moulding process were subjected to determinations of their extensibility and in all cases the results were less than 50%.

EXAMPLES 7–11

The matrix material of Example 1 was used for the preparation of formulations further including a polymer of poly-epsilon-caprolactone, in the formulations given in the table below and under the conditions described in Example 2.

| Example        | 7  | 8  | 9  | 10 | 11 |
|----------------|----|----|----|----|----|
| Matrix: Ex. 1  | 70 | 70 | 70 | 65 | 55 |
| Wood Flour     | 20 | —  | —  | 25 | 25 |
| Cellulose (§)  | —  | 20 | —  | —  | —  |
| Raffia (*)     | —  | —  | 20 | —  | —  |
| P 300          | 10 | —  | —  | —  | —  |
| P 767          | —  | 10 | —  | —  | 10 |
| P 787          | —  | —  | 10 | —  | —  |
| glycerine      | —  | —  | —  | 10 | 10 |

P 300, P 767, P 787: poly-epsilon-caprolactone Union Carbid
(§) Cellulose Solka Floc BW300 FCC
(*) Raffia Satralit FNT/134-4SG In all cases, the dumb-bell shaped test pieces obtained in accordance with Example 2 were seen to have a modulus of elasticity greater than 1000 MPa with a water content in the samples of between 4 and 5%.

The compositions according to the invention could be worked by conventional working processes for plastics materials in particular by extrusion and injection moulding to produce shaped articles such as profiled sections and containers and expanded articles. These articles fall within the scope of the invention.

What is claimed is:

1. A polymeric composition comprising a filler melt-dispersed in a matrix comprising:
   (a) a destructurized starch component;
   (b) a synthetic thermoplastic polymeric component selected from the group consisting of polyvinylalcohol, polyvinyl acetate, thermoplastic polyesters and graft copolymers of polysaccharides; and
   (c) a fluidizing agent selected from the group consisting of $C_{12}$–$C_{22}$ fatty acids, $C_{12}$–$C_{22}$ fatty alcohols, esters and amides of said fatty acids, polyolefin waxes, polyglycol ethers of alditols, polyglycerols esterified with $C_{12}$–$C_{22}$ fatty acids, and mixtures thereof,
   wherein said filler is a mixture of an inorganic filler and a filler of organic nature, wherein the organic filler is present in an amount from 5% to 70% by weight.

2. A polymeric composition according to claim 1, wherein the weight ratio between the starch component and the synthetic thermoplastic component is from 1.5:1 to 9.8:0.2.

3. A polymeric composition according to claim 1, wherein the filler is a mixture of fillers selected from the group consisting of wood flour, walnut shell flour, cellulose, cotton, jute, raffia, rice chaff, animal bristles, chitin, granular starch, talc, mica, titanium dioxide, and aluminum oxide.

4. A polymeric composition according to claim 3, wherein the weight ratio between the starch component and the synthetic thermoplastic component is from 1:9 to 9.8:0.2.

5. A polymeric composition according to claim 1, wherein the fillers have an average size of between 0.5 and 500 microns.

6. A polymeric composition according to claim 5, wherein the weight ratio between the starch component and the synthetic thermoplastic component is from 1:9 to 9.8:0.2.

7. A polymeric composition according to claim 1, wherein the fillers have a shape ratio L/D of between 2 and 50.

8. A polymeric composition according to claim 7, wherein the weight ratio between the starch component and the synthetic thermoplastic component is from 1:9 to 9.8:0.2.

9. A polymeric composition according to claim 1, obtained by extrusion-cooking of the starch component, the synthetic thermoplastic polymeric component, the fluidizing agent and the filler in the presence of a plasticizer and/or water.

10. An expanded article comprising a composition according to claim 1.

* * * * *